US011227300B2

(12) United States Patent
Courtot

(10) Patent No.: US 11,227,300 B2
(45) Date of Patent: Jan. 18, 2022

(54) COMPUTER-NETWORK-BASED REFERRAL SERVICE FUNCTIONS AND USER INTERFACES

(71) Applicant: MODFIND LLC, Miami, FL (US)

(72) Inventor: Frederic Courtot, San Francisco, CA (US)

(73) Assignee: MODFIND LLC, Miami, FL (US)

( * ) Notice: Subject to any disclaimer, the term of this patent is extended or adjusted under 35 U.S.C. 154(b) by 278 days.

(21) Appl. No.: 15/619,207

(22) Filed: Jun. 9, 2017

(65) Prior Publication Data
US 2018/0357656 A1    Dec. 13, 2018

(51) Int. Cl.
G06Q 30/02 (2012.01)
G06Q 20/40 (2012.01)
G06Q 30/06 (2012.01)
G06Q 20/12 (2012.01)

(52) U.S. Cl.
CPC ......... *G06Q 30/0214* (2013.01); *G06Q 20/12* (2013.01); *G06Q 20/40* (2013.01); *G06Q 30/0611* (2013.01)

(58) Field of Classification Search
CPC ............... G06Q 30/0214; G06Q 20/40; G06Q 30/0611; G06Q 20/12
USPC ...................................................... 705/14.16
See application file for complete search history.

(56) References Cited

U.S. PATENT DOCUMENTS

| | | | | |
|---|---|---|---|---|
| 5,841,525 A | * | 11/1998 | Rosow | G01M 11/0292 356/124.5 |
| 5,882,311 A | * | 3/1999 | O'Rourke | A61B 5/021 600/485 |
| 6,393,015 B1 | * | 5/2002 | Shtivelman | H04M 3/42195 370/352 |
| 6,429,882 B1 | * | 8/2002 | Abdelnur | G06F 16/2428 715/763 |
| 6,687,527 B1 | * | 2/2004 | Wu | G01R 33/546 324/318 |
| 7,082,454 B1 | * | 7/2006 | Gheith | G06F 16/9574 709/203 |

(Continued)

OTHER PUBLICATIONS

Trademark Electronic Search System (TESS), Amazon, Jul. 20, 2017, United States Patent and Trademark Office.*

(Continued)

*Primary Examiner* — Abhishek Vyas
*Assistant Examiner* — Patrick Kim
(74) *Attorney, Agent, or Firm* — Schwegman Lundberg & Woessner, P.A.

(57) ABSTRACT

A method of improving a network-based marketplace system with referral-service functionality is disclosed. One or more notifications are received from a client device of a first user of a plurality of users. The one or more notifications include an authorization from the first user to make a payment to complete a purchase of an item included in a listing posted on the network-based publication system. The one or more notifications also include a referral code associated with the authorization. The payment is received from the first user into a holding account. Based on the referral code, a second user of the plurality of users is identified as a referrer of the purchase. The payment is divided into a plurality of payments to be made to a seller of the item as a purchase fee and to be made to the referrer of the purchase as a referral fee.

19 Claims, 14 Drawing Sheets

(56) References Cited

U.S. PATENT DOCUMENTS

| | | | | |
|---|---|---|---|---|
| 7,908,182 B1* | 3/2011 | Gupta | .................... | G06Q 20/10 235/375 |
| 2001/0034016 A1* | 10/2001 | Ziv-el | .................... | G09B 7/02 434/350 |
| 2002/0004735 A1* | 1/2002 | Gross | ................ | G06Q 30/0214 705/26.41 |
| 2002/0077929 A1* | 6/2002 | Knorr | .................. | G06Q 10/087 705/26.81 |
| 2002/0082901 A1* | 6/2002 | Dunning | ............ | G06Q 30/0277 705/26.63 |
| 2002/0154173 A1* | 10/2002 | Etgen | .................. | G06F 3/04855 715/833 |
| 2003/0093317 A1* | 5/2003 | Robinson | ............... | G06Q 30/02 705/14.15 |
| 2003/0191750 A1* | 10/2003 | Espino | .............. | H04M 1/72519 |
| 2005/0086207 A1* | 4/2005 | Heuer | ............... | G06F 17/30398 |
| 2005/0183017 A1* | 8/2005 | Cain | .......................... | G06F 8/38 715/719 |
| 2005/0203821 A1* | 9/2005 | Petersen | ................ | G06Q 40/06 705/36 R |
| 2006/0167776 A1* | 7/2006 | Conaty | ................... | G06Q 40/00 705/35 |
| 2006/0206412 A1* | 9/2006 | Van Luchene | ..... | G06Q 30/0633 705/37 |
| 2006/0288053 A1* | 12/2006 | Holt | ....................... | G06F 16/273 |
| 2007/0035812 A1* | 2/2007 | Roller | .................... | G06Q 99/00 359/337.1 |
| 2007/0156446 A1* | 7/2007 | Jolly | ....................... | G06Q 30/02 705/1.1 |
| 2007/0157118 A1* | 7/2007 | Wuttke | ................. | G06F 16/957 715/810 |
| 2007/0208776 A1* | 9/2007 | Perry | ...................... | G06F 16/58 |
| 2007/0219842 A1* | 9/2007 | Bansal | ................... | G06Q 10/06 715/810 |
| 2008/0155588 A1* | 6/2008 | Roberts | .................. | G06Q 30/00 725/34 |
| 2008/0168055 A1* | 7/2008 | Rinearson | ............. | G06F 16/907 |
| 2008/0263447 A1* | 10/2008 | Garg | ....................... | G06F 3/038 715/716 |
| 2008/0319812 A1* | 12/2008 | Sousa | .................... | G06Q 10/06 705/7.36 |
| 2009/0069084 A1* | 3/2009 | Reece | ...................... | A63F 13/12 463/32 |
| 2009/0100080 A1* | 4/2009 | Toms | ...................... | G06F 16/48 |
| 2009/0298129 A1* | 12/2009 | Spence | .................. | B01L 3/021 435/91.2 |
| 2009/0307098 A1* | 12/2009 | Verona | ................... | G06Q 20/10 705/17 |
| 2010/0094699 A1* | 4/2010 | Beal | ....................... | G06Q 30/02 705/14.25 |
| 2010/0218128 A1* | 8/2010 | Bonat | .................... | G06Q 30/02 715/765 |
| 2010/0306080 A1* | 12/2010 | Trandal | .................. | G06Q 10/10 705/26.8 |
| 2011/0040634 A1* | 2/2011 | Landsberry | ............ | G06Q 30/02 705/14.69 |
| 2011/0196725 A1* | 8/2011 | Malcolmson | .......... | G06Q 30/02 705/14.16 |
| 2011/0218846 A1* | 9/2011 | Fieldman | ........... | G06Q 30/0214 705/14.16 |
| 2011/0282722 A1* | 11/2011 | Chopra | .............. | G06Q 30/0214 705/14.16 |
| 2012/0045744 A1* | 2/2012 | Nickolai | .................. | G09B 7/00 434/322 |
| 2013/0211951 A1* | 8/2013 | Kalinin | .................. | G06Q 30/06 705/26.7 |
| 2013/0226710 A1* | 8/2013 | Plut | ........................ | G06Q 30/02 705/14.67 |
| 2014/0164082 A1* | 6/2014 | Sun | ........................ | G06Q 30/02 705/14.16 |
| 2014/0229191 A1* | 8/2014 | Ryan | .................... | G06F 19/3456 705/2 |
| 2014/0298204 A1* | 10/2014 | Jayaram | ................ | H04L 67/306 715/753 |
| 2015/0040068 A1* | 2/2015 | Puckett | .............. | G06Q 30/0214 715/833 |
| 2015/0347531 A1* | 12/2015 | Tan | ........................ | H04L 67/02 707/722 |
| 2015/0371251 A1* | 12/2015 | Limbasia | ........... | G06Q 30/0214 705/14.16 |
| 2017/0220976 A1* | 8/2017 | Schmidt | ............... | G06Q 10/083 |
| 2017/0301003 A1* | 10/2017 | Spitz | .................. | G06Q 30/0631 |

OTHER PUBLICATIONS

Trademark Electronic Search System (TESS), LetGo, Jul. 20, 2017, United States Patent and Trademark Office.*

Trademark Electronic Search System (TESS), Craigslist, Jul. 20, 2017, United States Patent and Trademark Office.*

Trademark Electronic Search System (TESS), Paypal, Jul. 20, 2017, United States Patent and Trademark Office.*

Trademark Electronic Search System (TESS), Visa, Jul. 20, 2017, United States Patent and Trademark Office.*

Trademark Electronic Search System (TESS), Mastercard, Jul. 20, 2017, United States Patent and Trademark Office.*

Trademark Electronic Search System (TESS), American Express, Jul. 20, 2017, United States Patent and Trademark Office.*

Trademark Electronic Search System (TESS), Hoka, Jul. 20, 2017, United States Patent and Trademark Office.*

Wikipedia, the free encyclopedia, Escrow, Internet Archive Way Back Machine capture date of May 14, 2016.*

Jun et al., "A theory of consumer referral" (published in International Journal of Industrial Organization, vol. 26, Issue 3, May 2008, pp. 662-678) (Year: 2008).*

"International Application Serial No. PCT/US2018/036733, International Search Report dated Jul. 20, 2018", 2 pgs.

"International Application Serial No. PCT/US2018/036733, Written Opinion dated Jul. 20, 2018", 23 pgs.

"Escrow", Wikipedia at the Internet Archive Way Back Machine, URL: https://en.wikipedia.org/wiki/Escrow, (accessed May 14, 2016), 6 pgs.

"European Application Serial No. 18813023.1, Response filed Nov. 2, 2020 to Extended European Search Report dated Mar. 31, 2020", 1 pg.

* cited by examiner

600

MARKETPLACE APPLICATION – SELLER MODE ↓ — 602

CREATE LISTING

| BUYER MODE |
| FINDER MODE |

CATEGORY: CLOTHING > SHOES > MEN'S SH...
TITLE: HOKA HUPANA MEN'S SHOES
PHOTOS: ADD PHOTO 1 ... | ADD PHOTO 2 ...
SIZE: 11 ↓
CONDITION: [NEW] [USED]
KEYWORDS: HOKA ONE ONE HUPANA MEN'S SHOES
DESCRIPTION: MEN'S HOKA ONE ONE HUPANA MEN'S SHOES SIZE 11 NEW IN BOX...
ITEM PRICE: $120
FINDER'S FEE: $5    $0 —— $5 —— $10    [OPTIMIZE...]
TOTAL PRICE: $125
SHIPPING: $8 - $15 / USPS PRIORITY MAIL...
[BUYER PAYS]
[SELLER PAYS]
LISTING FEE: $1.50  [OPTIONS...]

[SUBMIT]

604 — FINDER'S FEE
606 — slider
608 — OPTIMIZE...

*FIG. 6*

800
| ⓟ MARKETPLACE APPLICATION – FINDER MODE ↓ | | | |
|---|---|---|---|
| | | SELLER MODE | |
| | | BUYER MODE | |
| HOKA SHOES | | | |
| ALL ITEMS > CLOTHING > MEN'S ATHLETIC SHOES | | | |
| IMAGE | TITLE ↓ | PRICE ↓ | FF ↓ |
|  | HOKA HUPANA MEN'S SHOES… | $125 | $5 |
|  | HOKA ONE ONE BONDI 5 RUNNING… | $179 | $4 |
|  | HOKA ONE ONE MENS STINSON… | $75 | $2 |
|  | HOKA ONE ONE HUPANA MEN'S… | $130 | $0 |
*FIG. 8*

1300

FRED

MARKETPLACE

Congratulations! Your friend Joe just purchased the Hoka Hupana Shoes that you recommended to him. You earned a $5 finder's fee! Click here to access your marketplace account for details.

TYPE A MESSAGE...

*FIG. 13*

COMPUTER-NETWORK-BASED REFERRAL SERVICE FUNCTIONS AND USER INTERFACES

TECHNICAL FIELD

The present application relates generally to the technical field of computer-network-based referral services, and, in one specific example, to incorporating one or more modules into a network-based marketplace system to enhance the network-based marketplace system to include functions and user interfaces for managing referrals pertaining to purchases of items listed on the network-based marketplace system.

BACKGROUND

Various network-based marketplace systems, including AMAZON®, LETGO®, and CRAIGSLIST®, facilitate online sales, including consumer-to-consumer, business-to-business, and business-to-consumer sales. For example, a seller may offer an item (e.g., a good or a service) for sale by posting one or more listings on one or more network-based marketplace systems. The listing(s) may specify information about the item, including, for example, images of the item and a price at which the seller is offering the item for sale.

Potential buyers may discover the listing by, for example, browsing categorized listings or submitting a search on the online marketplace system that returns search results that include the listing. Potential buyers may then select the listing within the categories or search results to view the information included the listing in more detail. In some cases, to accept an offer for the sale of the item, the user may activate a user interface element (e.g., a "Buy" or "Bid" button) to purchase or bid upon the item described in the listing. As part of the purchase process, the buyer may authorize an electronic payment for the item (e.g., using a payment method supported by the network-based marketplace system, such as credit card payments, debit card payments, PAYPAL® payments, or e-commerce payment systems or methods).

The seller, upon receiving the purchase request or the payment for the item, may then be notified via the online marketplace system of an obligation to provide the item featured in the listing to the buyer.

BRIEF DESCRIPTION OF THE DRAWINGS

Some embodiments are illustrated by way of example and not limitation in the figures of the accompanying drawings.

FIG. 6 is an example user interface for posting a listing that includes user interface enhancements for specifying a finder's fee to associate with the listing.

FIG. 8 is an example user interface for sorting search results based on the finder's fee associated with listings.

FIG. 13 is an example user interface for notifying a user that his account has been credited with a finder's fee.

DETAILED DESCRIPTION

Figure 1:
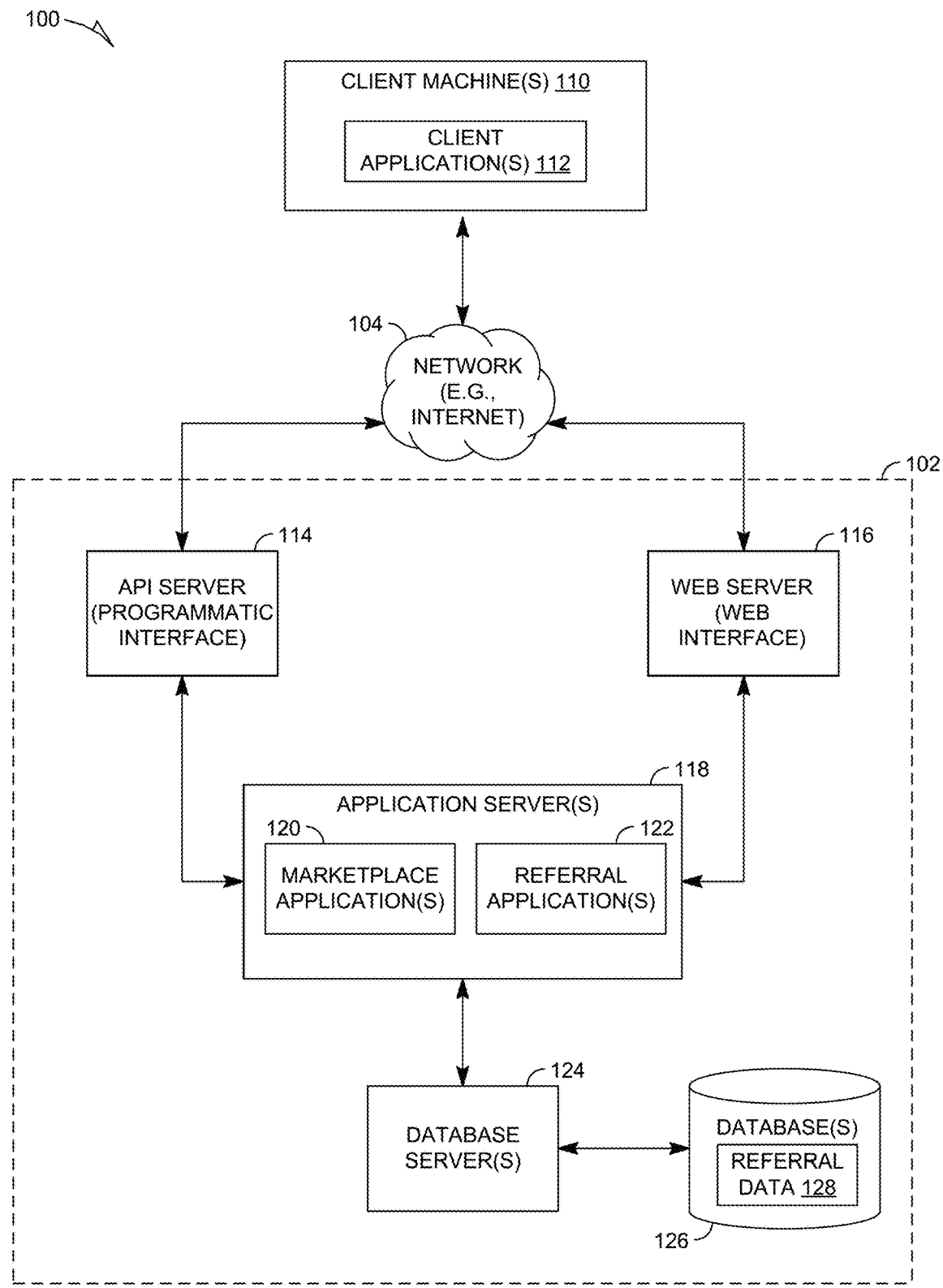
FIG. 1 is a network diagram depicting a client-server system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

An electronic commerce platform is disclosed that includes user interface and functional enhancements to incentivize intermediaries (e.g., "finders" or "referrers") to participate in bringing buyers and sellers together in an online marketplace to complete transactions. In example embodiments, the enhancements include allowing sellers to specify a finder's fee or commission to associate with a listing of an item that a seller posts on an electronic commerce platform, associating a completed transaction with an intermediary, and automatically dividing payments between various parties upon completion of a transaction.

The intermediaries may, through one or more user interface enhancements of the electronic commerce platform, identify deals (e.g., based on their personal expertise or other criteria) and bring the deals forth to interested parties (e.g., via their online social networks), such as interested parties that are included in the online social network of the intermediary, but not included in an online social network of the seller. In other words, intermediaries may be incentivized by the finder's fees to bring buyers and sellers together.

Because of the involvement of intermediaries, sellers may, in using the enhanced electronic commerce platform, realize multiple benefits, including, for example, making higher profits on items sold, selling items more quickly, having their listings reach more prospective buyers, and so on. An operator of the electronic commerce system may realize multiple benefits, including, for example, increasing daily active use of the system, increasing user satisfaction with the system, increasing a rate of completed transactions, receiving a higher transaction fee per transaction, and so on. A prospective buyer may also realize multiple benefits, including being alerted in a timely fashion by a trusted intermediary of listings of items that may be of particular interest to the buyer without having to engage in a separate discovery process to find the items.

The user interface and functional enhancements disclosed herein not only include improvements to the look and feel of a typical electronic commerce system, but also provide back-end data structures and algorithms to perform various referral-related functions, including linking finders to transactions completed on the electronic commerce system (e.g., via communications sent between the back-end systems and devices of the various parties) and automatically dividing payments between the various parties involved in transactions, including buyers, sellers, intermediaries, and operators (e.g., via payment processing operations, as described in more detail below).

In example embodiments, a method of improving a network-based marketplace system with referral-service functionality is disclosed. One or more notifications are received from a client device of a first user of a plurality of users. The one or more notifications include an authorization from the first user to make a payment to complete a purchase of an item included in a listing posted on the network-based publication system. The one or more notifications also include a referral code associated with the authorization. The payment is received from the first user into a holding account. Based on the referral code, a second user of the plurality of users is identified as a referrer of the purchase. The payment is divided into a plurality of payments. A first payment of the plurality of payments is to be made to a seller of the item as a purchase fee and a second payment of the plurality of payments to be made to the referrer of the purchase as a referral fee. The first payment is transferred into an account of the seller of the item and the second payment is transferred to an account of the referrer of the purchase.

This method and various embodiments disclosed herein may be implemented as a computer system having one or more modules (e.g., hardware modules or software modules). This method and various embodiments disclosed herein may be stored as instructions on a machine-readable medium that, when executed by a machine, cause the machine to perform this method or various embodiments disclosed herein.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients machines 110. FIG. 1 illustrates client application(s) 112 on the client machines 110. Examples of client application(s) 112 may include a web browser application, such as the Internet Explorer browser developed by Microsoft Corporation of Redmond, Wash. or other application supported by an operating system of the device, such as Windows, iOS or Android operating systems. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more server application(s) 120. The application servers 118 are, in turn, shown to be coupled to one or more database servers 124 that facilitate access to one or more databases 126 or data stores, such as NoSQL or non-relational data stores.

The marketplace applications 120 may provide a number of marketplace functions, services, and user interfaces, and referral applications 122 may include enhancements to the marketplace applications 120, including enhancements to the functions, services, and user interfaces of the marketplace applications 120 to provide one or more of the referral features disclosed herein.

While the applications 120 and 122 are shown in FIG. 1 to form part of the networked system 102, in alternative embodiments, the applications 120 and 122 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various server applications 120 and 122 could also be implemented as standalone software programs, which do not necessarily have networking capabilities. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PAYPAL®, VISA®, MASTERCARD®, and AMERICAN EXPRESS®).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. For example, the third-party applications may, utilizing information retrieved from the networked system 102, support one or more features or functions on a website hosted by the third party. The third-party website may, for example, provide one or more promotional, marketplace or payment functions that are integrated into or supported by relevant applications of the networked system 102.

The server applications 120 and 122 may be hosted on dedicated or shared server machines (not shown) that are communicatively coupled to enable communications between server machines. The server applications 120 and 1122 themselves are communicatively coupled (e.g., via appropriate interfaces) to each other and to various data sources, so as to allow information to be passed between the server applications 120 and 122 and so as to allow the server applications 120 and 122 to share and access common data. The server applications 120 and 122 may furthermore access one or more databases 126 via the database servers 124. In example embodiments, referral data 128 is stored in the databases 126, including mapping of finder's fees to historical transaction data and attributes of items featured in listings pertaining to past transactions, including successful and unsuccessful transactions, as explained in more detail below. In example embodiments, successful transactions include transactions in which a buyer accepted a seller's offer for the sale of an item featured in a listing and authorized transferring of funds from an account of the buyer as payment. In example embodiments, unsuccessful transactions include transactions in which a seller was unable to find a buyer for an item featured in a listing.

The networked system 102 may provide a number of publishing, listing and price-setting applications, whereby a seller may list (or publish information concerning) goods or services for sale, a buyer can express interest in or indicate a desire to purchase such goods or services, and a price can be set for a transaction pertaining to the goods or services. To this end, the server applications 120 are shown to include at least one publication application and one or more price setting applications, such as auction and fixed-price price setting applications.

Navigation of the networked system 102 may be facilitated by one or more navigation applications. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications. In order to make listings available via the networked system 102 as visually informing and attractive as possible, the marketplace applications 120 may include one or more imaging applications, which users may utilize to upload images for inclusion within listings. An imaging application also operates to incorporate images within viewed listings.

Listing creation applications allow sellers to conveniently author listings pertaining to goods or services that they wish to transact via the networked system 102, and listing management applications allow sellers to manage such listings.

Messaging applications are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications may utilize any one of a number of message delivery networks and platforms to deliver messages to users. For example, messaging applications may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Figure 2:
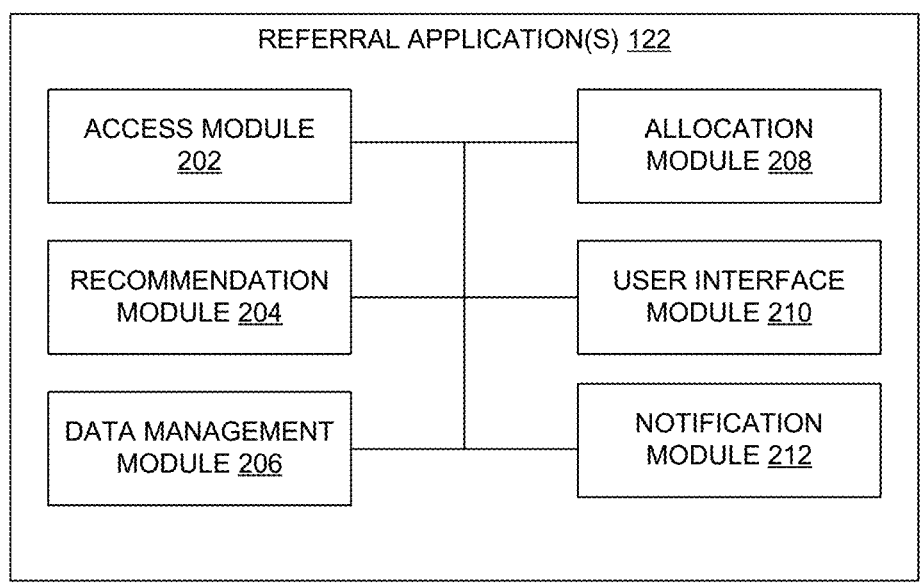
FIG. 2 is a block diagram illustrating example modules of the referral applications of FIG. 1.

FIG. 2 is a block diagram illustrating example modules of the referral application(s) 122. An access module 202 is configured to detect accessing of the networked-based publication system by a user and determine a context of the accessing (e.g., whether the user is accessing the system as a buyer, seller, or intermediary). A recommendation module 204 is configured to recommend one or more finder's fees to a user (e.g., based on historical transaction data). A data management module 206 is configured to store and analyze referral fee data, including mapping of referral fee data to success factors pertaining to listings and attributes of items featured in listings for use in generating recommendations. An allocation module 208 is configured to allocate funds between interested parties to a successfully-completed transaction, including determining an appropriate splitting of the funds between buyers, sellers, intermediaries, and an operator of the network-based publication system and implementing transferring of funds between accounts of the interested parties. A notification module 212 is configured to notify users of referrals, completed transactions, and so on, via specified or preferred communication channels. A user interface module 210 is also included.

Figure 3:
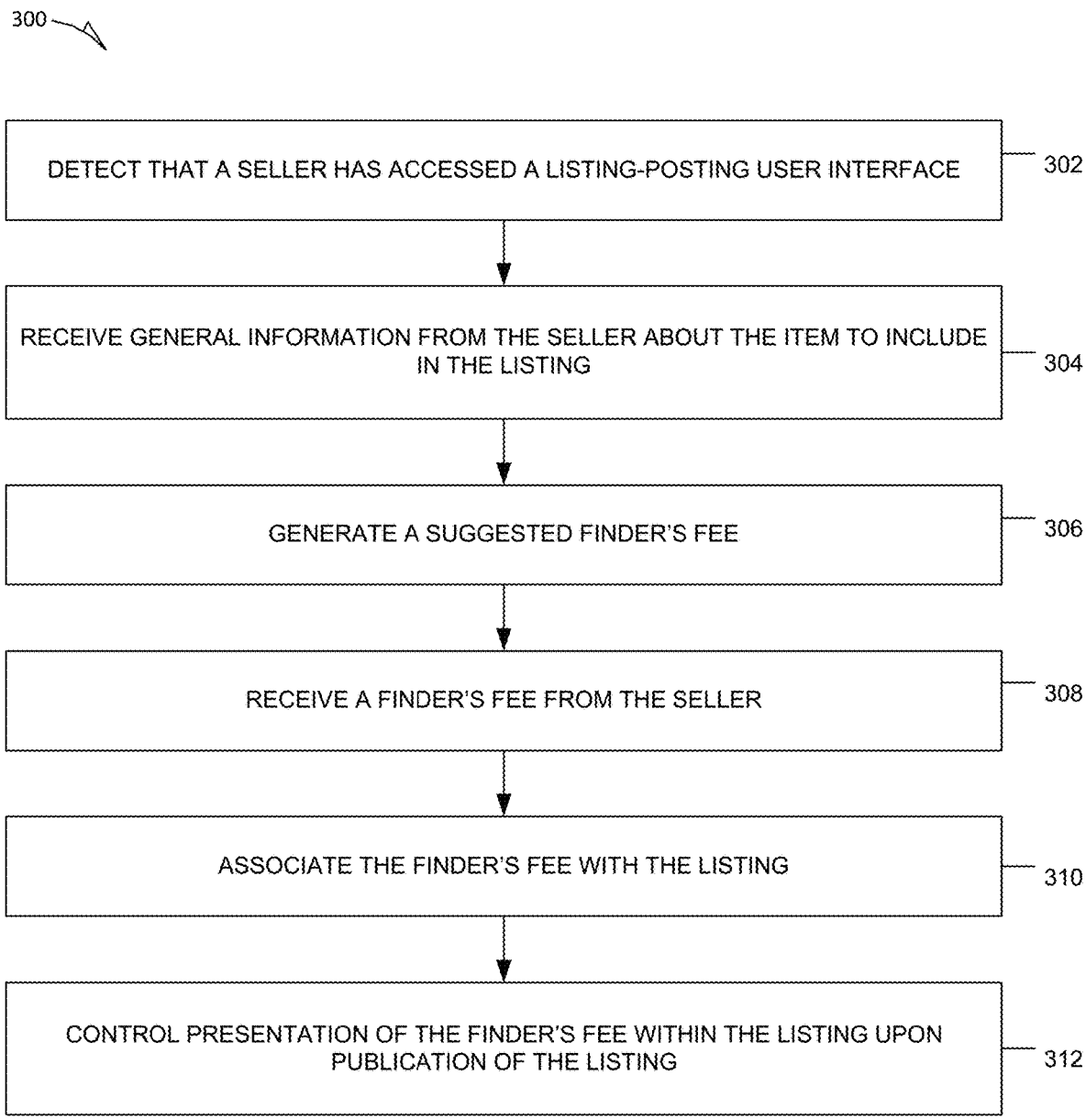
FIG. 3 is a flowchart illustrating example operations of a method of enhancing a network-based publication system to allow sellers of items to associate a finder's fees with listings of the items.

FIG. 3 is a flowchart illustrating example operations of a method 300 of enhancing a network-based publication system to allow sellers of items to associate a finder's fees with listings of the items. In example embodiments, the method 300 is performed by one or more of the modules of FIG. 2.

At operation 302, a seller of an item accesses a posting user interface (e.g., via one of the marketplace applications 120 of the network-based publication system) to begin a process of submitting a listing for the item for publication on the network-based publication system.

At operation 304, the seller uses the posting user interface to specify general information about the item to include in the listing (e.g., title of the item, category of the item, condition of the item, price of the item, photos of the item, description of the item, duration of the listing of the item, listing type of the item (e.g., auction or fixed price), shipping details for the item (e.g., delivery time, costs, and so on), geographical availability of the item (e.g., local domestic, or international), and so on).

At operation 306, one or more supplemental user interfaces or user interface elements are incorporated into the posting user interface or provided in conjunction with the posting user interface to provide a suggestion of an effective referral fee for the item. In example embodiments, the finder's fee includes an amount that the seller is offering to pay to an intermediary who is responsible for finding a buyer for the item. The finder's fee may be a charge that, in addition to a price for the item specified by the seller, is passed on to the buyer who completes a transaction to purchase the item. In other words, the total price shown to potential buyers who view the listing may be the price of the item plus the finder's fee.

The suggestion may be based on various factors, including an analysis of historic transaction data pertaining to finder's fees offered by the seller or other sellers with respect to previously-listed items, such as previously-listed items having attributes that match the general information specified by the seller about the item. The measurements of success of previous finder's fees may include a comparison of performances of listings having different ranges of finder's fees relative to prices of the items listed. In addition, the measurements of success may be broken down by various factors, including popularity of the item, a type or category of the item (e.g., Automobiles, Fashion, Electronics, Art, home & Garden, Toys. Business & industrial, Music, and so on), supply data (e.g., a number of suppliers of the item or similar item, a number of past or current listings of the item or similar items, and so on), demand data (e.g., a number of viewings by potential buyers of listings of the item or similar items, a number of purchases made of the item or similar items, and so on), transaction completion speed (e.g., from time of listing to time of completed purchase), methods of payments previously used by buyers for the item or similar items, satisfaction of buyers with respect to previous purchases of the item, and so on.

For example, if a seller is selling an automotive part or accessory, the recommendation may include a range of values from the $0 to the highest finder's fee that previously led to a successful completion of a transaction on the network-based publication system for the specific automotive part or accessory, automotive parts generally, other (e.g., non-automotive-category items) having a similar price, other items having a similar popularity, other items having similar supply or demand data, and so on. In example embodiments, the suggested range may include a graph of the measurements of success with respect to any of the relevant factors described herein. For example, the suggestion may include a graph of a range of previously-successful finder's fees against average transaction completion speed, thus allowing the seller to determine an optimal finder's fee for a listing based on transaction speed. Or, the suggestion may include a graph of a range of previously-successful finder's against a popularity factor (e.g., a number of viewings of previous listings for the item or similar items), thus allowing the seller to determine an optimal finder's fee based on an expected increased popularity of the listing.

In example embodiments, multiple measurements of success may be provided together to the seller in a single or multiple graphs. In example embodiments, the user interface may include one or more user interface elements to allow the seller to select one or more of the factors for which to optimize the recommendation, hiding the specific details upon which the recommendation is based from the user. Thus, in example embodiments, a single recommendation of a finder's fee may be made based on one or more factors selected by the seller. In example embodiments, the determination of which factors to include in calculating an optimal finder's fee may not be configurable by the seller and may instead be predetermined by an operator or administrator. In example embodiments, the recommendation may not only be based on factors that would benefit the seller, but also factors that would benefit the operator of the network-based publication system (e.g., that would increase a number of users of the system, increase activity or engagement of the users of the system, increase a number of completed transactions on the system, increase user satisfaction with respect to the system, increase transactions fees collected, increase advertising fees collected, and so on).

In example embodiments, a machine-learning algorithm may be configured to, based on one or more of the factors discussed herein, determine an optimal finder's fee for an item in real time as more items are sold and additional transaction data is collected. For example, the machine-learning algorithm may be seeded with success metrics for past finder's fees and the success metrics may be modified as additional data is collected. Additionally, a window of most recent data may be incorporated, with older data discarded from the training model. Thus, after an initial seeding of success metrics, the recommended finder's fee may be based on the most recent transaction data within a specified window of time (e.g., hours, days, months, or years).

In example embodiments, transaction records of past transactions within a specified window are analyzed to identify a correlation between finder's fees and various other parameters pertaining to the past transactions, including sales price, speed of sale (e.g., from time of posting of the listing for the item), geographical area (e.g., of sellers and/or potential buyers), proximity of sellers to buyers, social actions of potential buyers with respect to postings of items (e.g., liking, forwarding, commenting, sharing, and so on), behavior of the user with respect to the marketplace system from which interest in postings can be inferred (e.g., watching or bookmarking of postings), categories into which the posting is categorized, a type of the item, and so on. Thus, in example embodiments, an optimum referral fee may be identified for any parameter of interest, allowing a seller to select a particular finder's fee to incentivize particular behaviors of potential buyers or intermediaries with respect to the posting.

For example, if a seller wishes to maximize a number of shares of his posting, the seller may view data pertaining to which finder's fees (e.g., as a percentage of sales price) led to the most number of shares of postings of past transactions. The seller may be able to overlay additional data elements, including total sales price, speed of sale, and so on, to determine an optimal finder's fee for the item the seller intends to post.

The referral data 128 may include data structures associating finder's fees with any of various parameters pertaining to past transactions, providing indexing of the referral fee data for fast access by the referral application(s) 122. Thus, up-to-date optimal referral fee data for a particular item may be presented in real-time or near real-time to a seller of the item for analysis and filtering.

At operation 308, one or more supplemental user interfaces or user interface elements are incorporated into the posting user interface or provided in conjunction with the posting user interface to receive a finder's fee from the seller. For example, the seller may select one of the recommended finder's fees or manually specify a different finder's fee. In example embodiments, the supplemental user interface elements automatically adjust the total listing price based on modifications made by the seller to the item price or the finder's fee. For example, upon entering the general information about the item, a recommended finder's fee may be automatically included in an editable user interface element. Upon editing of the editable user interface element, the total price may be adjusted. In example embodiments, the finder's fee may be set at $0 initially in the editable user interface element and the recommended finder's fee may be displayed in conjunction with the editable user interface element for use as desired by the seller. In some embodiments, the recommended finder's fee is automatically recalculated whenever the seller changes one or more specified general information data items, such as a price for the item featured in the listing, and the total listing price is, in turn, automatically recalculated as well.

At operation 310, the network-based publication system stores the specified finder's fee and associates the specified finder's fee with the listing, in addition to the general information about the item specified by the seller. The associating of the finder's fee with the listing may include updating or modifying a database entry for the item, including adding or using an enhanced or custom field that includes the specified finder's fee.

At operation 312, the network-based publication system publishes the listing. The published listing may or may not show the finder's fee in addition to the price for the item. In example embodiments, whether the finder's fee is shown to a particular viewer may depend on a context in which a viewer accesses the listing. For example, if the viewer is a potential buyer who is accessing the listing from a referral URL (as described in more detail below), the finder's fee may not be shown to the viewer. Instead, the viewer may only see the total price of the item. In example embodiments, if the viewer is a potential intermediary who is accessing the listing to determine whether to tap into the intermediary's social network to identify a buyer for the item featured in the listing (as described in more detail below), the viewer may be shown the finder's fee as an incentive. Similarly, if the viewer is the seller of the item, the full details of the listing, including the finder's fee, may be shown.

Figure 4:
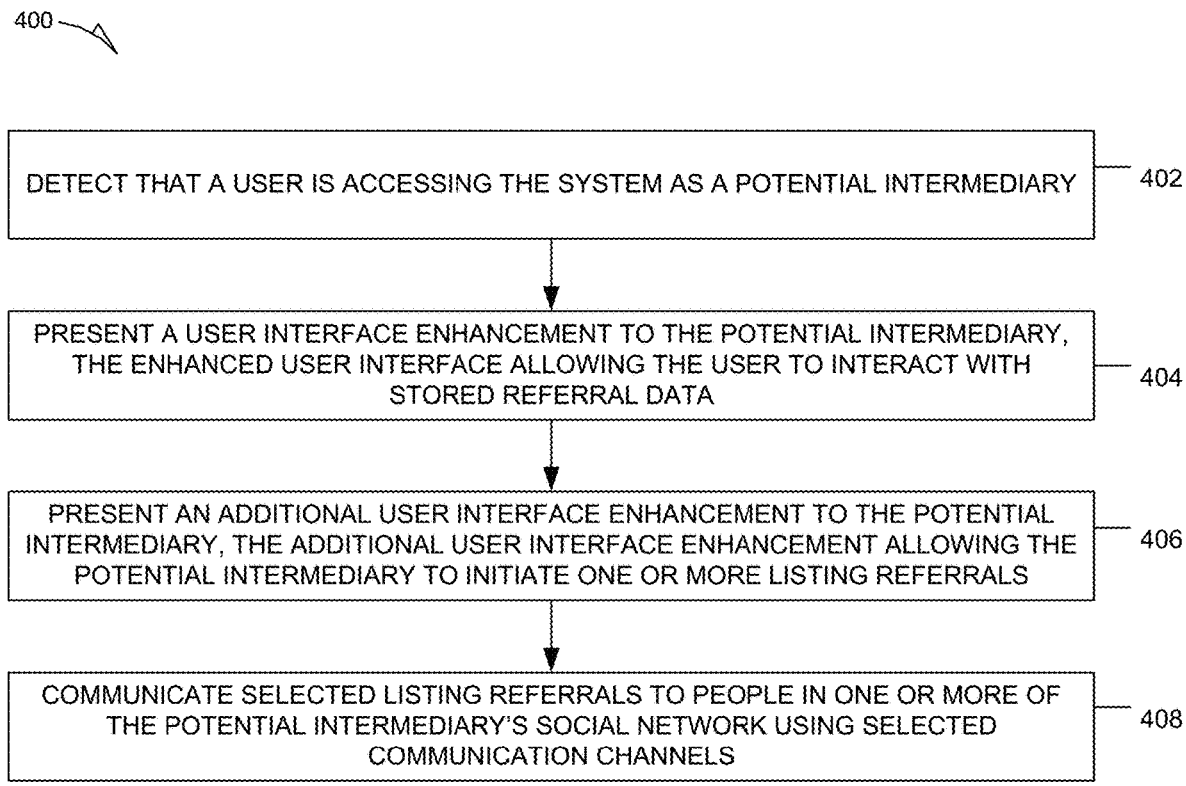
FIG. 4 is a flowchart illustrating example operations of a method of enhancing a network-based publication system with user interfaces to allow a potential intermediary to view, act upon, and collect finder's fees associated with listings posted on the network-based publication system.

FIG. 4 is a flowchart illustrating example operations of a method 400 of enhancing a network-based publication system with user interfaces to allow a potential intermediary to view, act upon, and collect finder's fees associated with listings posted on the network-based publication system. In example embodiments, the method 400 is performed by one or more of the modules of FIG. 2.

At operation 402, it is determined that the user accessing the system is a potential intermediary. In example embodiments, this determination may be based on a specific mode by which the user is accessing the system (e.g., the user may specify that the user is accessing the in an intermediary mode, as opposed to a buyer or seller mode). In example embodiments, the determination may be based on a determination that the user is not accessing the system as a potential buyer (e.g., based on an activation of a referral URL).

At operation 404, the network-based publication may present one or more enhanced user interfaces that, for example, allow the potential intermediary to browse, search, or view the listings to find listings that suit one or more criteria of the intermediary, such as amount of the finder's fee, finder's fee relative to price of item being sold, category of the item featured in the listing, popularity of the item featured the listing, or any of the factors discussed herein (e.g., with respect to the recommendation of the finder's fee or elsewhere). Thus, for example, the potential intermediary may be able to search for all items having a finder's fee above a certain threshold amount or within a certain range. Additionally, the potential intermediary may be able to filter search results based on category of the items (e.g., to find items matching the potential intermediary's expertise). Upon viewing a listing, one or more user interface enhancements may highlight the specified finder's fee, such that it is more prominently displayed within the listing, for example.

At operation 406, the network-based publication system may provide one or more recommendation user interfaces to allow the potential intermediary to become eligible to receive the finder's fee by advertising or referring one or more listings to one or more people within a social network of the potential intermediary. The one or more user interfaces may include a "Referral" button or the like, which may be presented in conjunction with or alongside the highlighted referral fee within a listing or in conjunction with or alongside search results that are displayed to the potential intermediary within the enhanced search results listing described above.

In example embodiments, the recommendation user interfaces may include one or more user interface elements allowing the user to select one or more people included in one or more social networks of the user who may be interested in the listing. In example embodiments, people within the social networks of the intermediary may be identified based on information included in profiles of the people. Thus, for example, if the referral by the intermediary is for an automotive part or service, people within one or more social networks of the user who have expressed an interest in automobiles or who have purchased or sold similar automobile services or parts may be automatically recommended as potential candidates for a referral to be sent from the intermediary.

At operation 408, the one or more referral modules communicate the recommendations to the selected people in the intermediary's social networks via the selected communication channels. In example embodiments, the referral modules log the referrals as well as information about the one or more selected referees in custom database entries associated with the listings. In example embodiments, the referral includes a link to the listing that includes a custom identifier identifying the intermediary who sent the referral.

In example embodiments, the people to which the referrals are sent may not be users or members of the network-based publication system.

Figure 5:
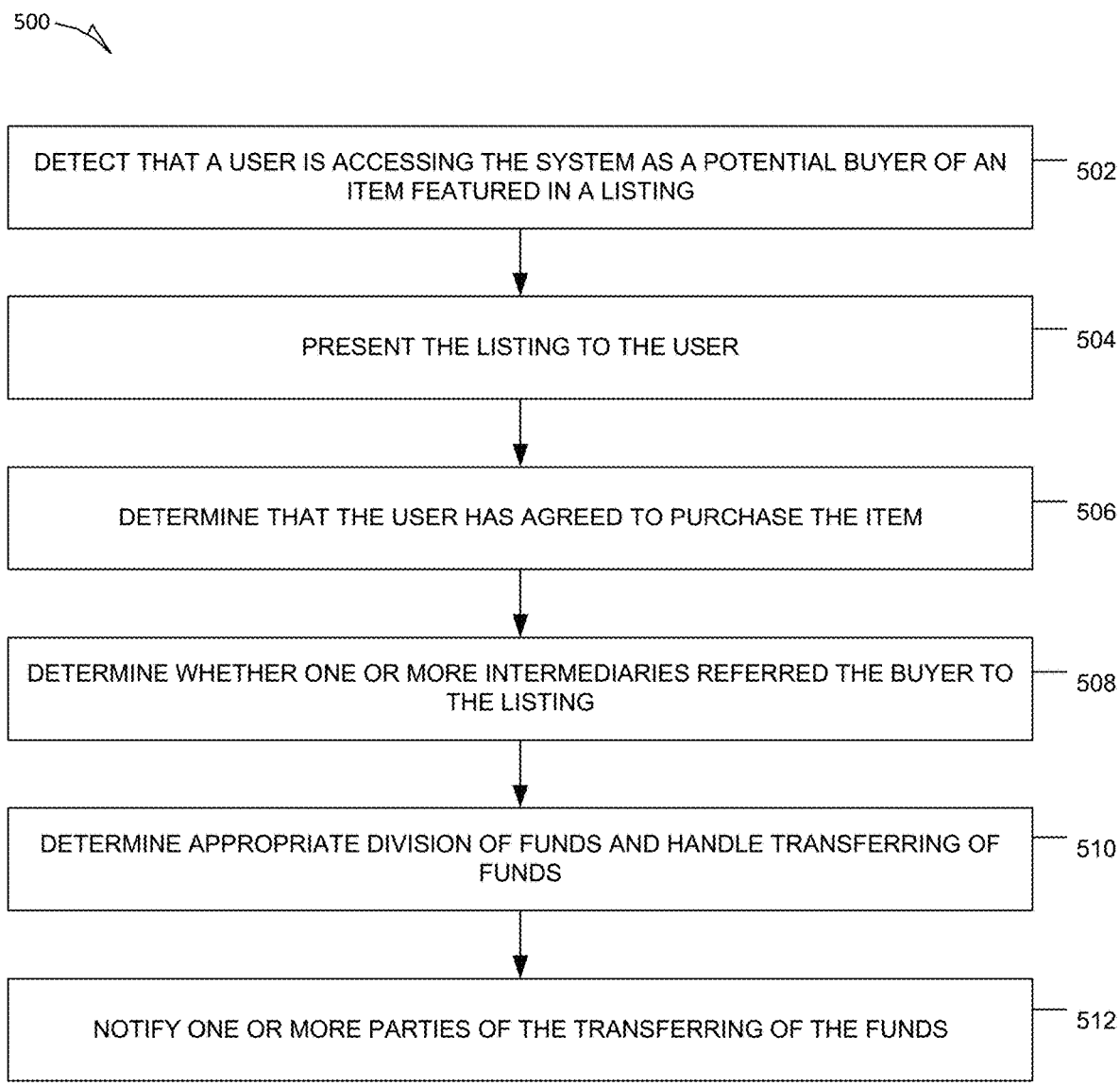
FIG. 5 is a flowchart illustrating example operations of a method of enhancing a network-based publication system with user interfaces for communicating referrals to potential buyers and facilitating transactions between sellers and potential buyers in an environment that includes intermediaries.

FIG. 5 is a flowchart illustrating example operations of a method 500 of enhancing a network-based publication system with user interfaces for communicating referrals to potential buyers and facilitating transactions between sellers and potential buyers in an environment that includes intermediaries. In example embodiments, the method 400 is performed by one or more of the modules of FIG. 2.

At operation 502, the one or more referral modules detect an accessing of the network-based publication system by a potential buyer of an item featured in a listing. For example, it is detected that a user is accessing the system via a link included in a referral message that was sent to the potential buyer on behalf of an intermediary. Alternatively, it may be determined that the potential buyer is accessing the system as a potential buyer based on a mode expressly set by the potential buyer or based on a determination that the user is not accessing system as either a seller or intermediary. In other words, in example embodiments, a default mode for a user may be a potential buyer mode.

At operation 504, a listing for an item is communicated to a device of the buyer for presentation to the potential buyer in a user interface. In example embodiments, the listing may be presented based on an accessing of a direct link to the listing included in a referral communication (e.g., as discussed above). In example embodiments, the listing may be accessed by the potential buyer based on browsing or searching of the network-based publication system by the buyer. In example embodiments, upon an accessing of a listing by a buyer based on a referral, a database entry is updated to reflect the accessing, thus supporting measurements of the success of the referral (e.g., as described above). In example embodiments, the finder's fee is not shown to the potential buyer. In other words, the potential buyer may only see the total price (the price of the item plus the finder's fee) associated with the listing. In example embodiments, the finder's fee may be shown to the potential buyer (e.g., based on a preference of the seller, potential buyer, intermediary, or an administrator).

At operation 506, it is determined that the user has agreed to purchase an item featured in the listing for the total price (e.g., the price plus the finder's fee). For example, the user may click a "Buy" button or the like, submit a method of payment, and complete any other necessary steps to finalize the transaction.

At operation 508, it is determined whether an intermediary referred the buyer to the listing featuring the item. In example embodiments, the determination may be made based on an accessing of the system by the buyer via a link included in a referral communication sent to the buyer because of an action by the intermediary. In example embodiments, the determination may be made based on a matching of information about the buyer that is provided by the buyer to information about the buyer that is provided by the intermediary (e.g., a name, address, email address, username, and so on) in conjunction with a record of a communication having been initiated by the intermediary to the buyer with respect to the listing. Thus, in example embodiments, an intermediary may be identified as having been involved in the buyer completing the transaction even if the buyer did not access the system using the specific URL included in a referral message.

In example embodiments, when more than one intermediary is potentially associated with a transaction, the finder's fee may be split into multiple finder's fees or one of the intermediaries may be selected to receive the full amount of the finder's fee. In example embodiments, multiple intermediaries may be weighted or the one intermediary may be selected based on an assessment of a contribution of each of the multiple intermediaries to the completion of the transaction. In example embodiments, the assessment may be based on various factors, such as a closeness of the relationship between the intermediaries and the buyer, an amount of involvement by each of the intermediaries in the completion of the transaction (e.g., who sent the first referral, who sent the last referral, who sent the most reminders, whose referral link was used by the buyer, and so on). In example embodiments, the factors and weightings may be configurable by an administrator or the seller.

At operation 510, funds associated with the completed transaction are transferred into a holding account. The funds are split into multiple portions, including the price of the item, the one or more finder's fees, and a transaction fee. The amount of the price of the item is transferred into an account of the seller, the amounts of the finder's fees are transferred into the accounts of the one or more intermediaries, and the transaction fee is transferred into an account of the operator of the network-based publication system. In example embodiments, the transaction fee may be provided by the seller, the buyer, or the intermediary, or a combination of the seller, the buyer, or the intermediary. In example embodiments, the way in which the transaction fee is split between the parties may be predetermined (e.g., by an administrator) or configurable by the seller. From the perspective of the buyer, the transaction may be completed just as any normal transaction would be completed if it did not have a finder's fee associated with it. In fact, in some embodiments, because the finder's fee may not be presented to the buyer in a user interface, the buyer may be unaware of a finder's fee being associated with the listing and of the distribution of the finder's fee to one or more intermediaries upon completion of the transaction.

In other example embodiments, the buyer may be notified of the finder's fee. In some embodiments, the buyer may be provided with an option to select one of multiple referrers that are identified as possibly leading to the purchasing of the item of by the buyer or assign weightings or a recommended split of the finder's based on responsibility of each of the multiple referrers with respect to the completing of the transaction by the buyer. In example embodiments, the input of the buyer with respect to the finder who is responsible may be taken as-is or used to modify the determined amount of involvement of each of the intermediaries discussed above.

In example embodiments, the recommendation user interfaces may include one or more options for communication channels over which to provide the referral to the one or more people of the intermediary's social networks. For example, for each potential buyer, the user interfaces may provide the intermediary with the option to provide the referral to the potential buyer via text message, instant message, email, chat, and so on.

At operation 512, the one or more parties to the transaction (e.g., the buyer, seller, intermediary, or operator of the network-based publication system) may be notified of the transferring of the funds into one or more of the various accounts. For example, one or more of the buyer, seller, intermediary, or operator may receive a notification specifying that the offer for sale of the item in the listing was accepted by the buyer, that payment for the total amount was made by the buyer, that a finder's fee was transferred to an intermediaries or split between multiple intermediaries, that a transaction fee was deducted, and that the remaining funds were transferred into the account of the seller. The seller may then be under an obligation to provide the item to the buyer.

FIG. 6 is an example user interface 600 for posting a listing that includes user interface enhancements for specifying a finder's fee to associate with the listing. By default, the user has been placed into seller mode (e.g., based on the user activating an option to submit a listing). An activatable user interface element 602 allows the user to explicitly change between seller mode, buyer mode, and finder mode. An editable user interface component 604 allows the user to submit a finder's fee to associate with the listing. As discussed above, a recommended finder's fee may be provided by default. An activatable user interface component 606 may allow the user to change the finder's fee within a range. As discussed above, the range of values may be indicative of referral fees that have led to successfully-completed transactions by this user or other users with respect to this item or similar items. An activatable user interface element 608 may allow the user to further optimize the finder's fees based on various criteria, as discussed above.

Figure 7:
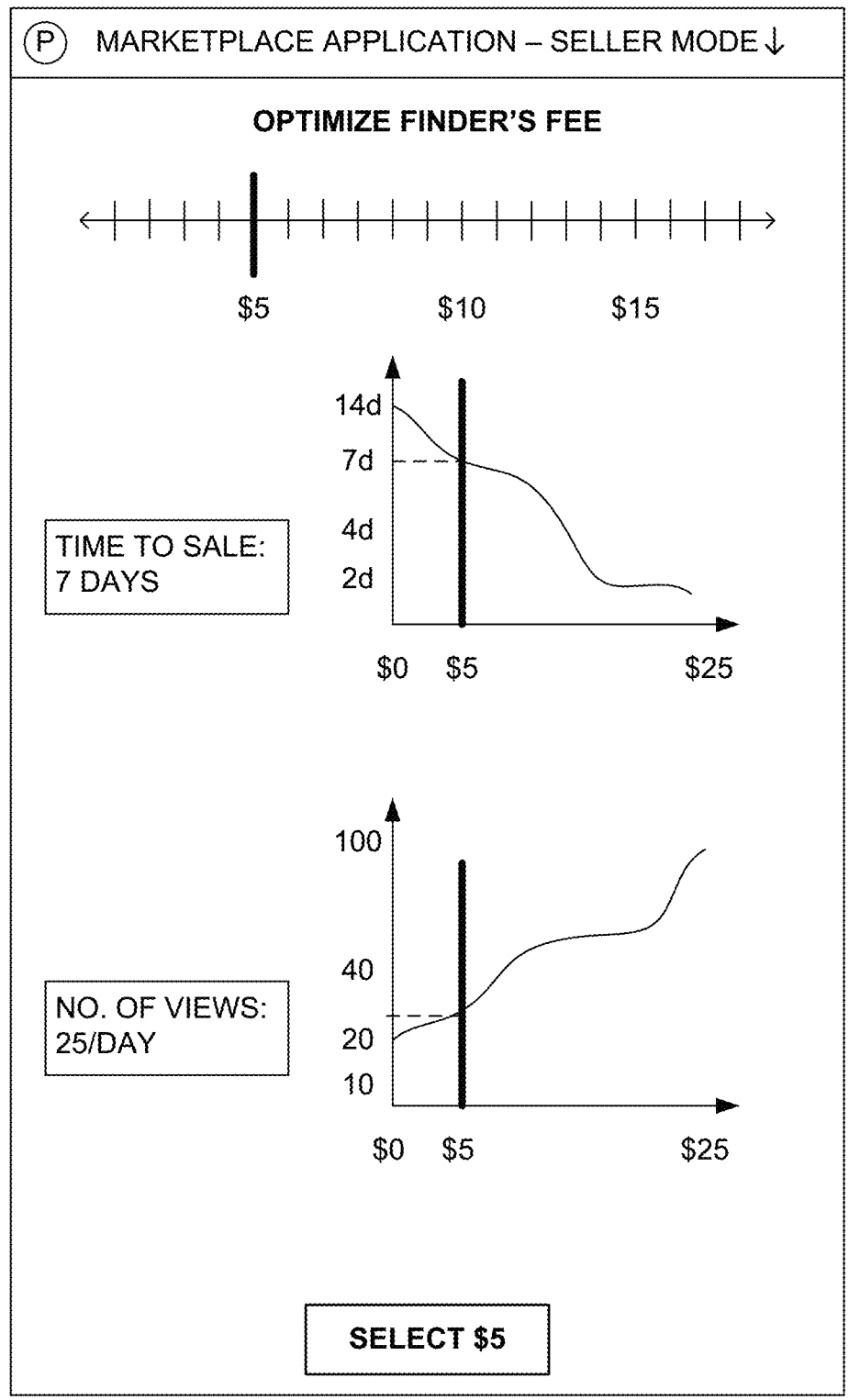
FIG. 7 is an example user interface for posting a listing that includes user interface enhancements for optimizing a finder's fee based on one or more criteria.

FIG. 7 is an example user interface 700 for posting a listing that includes user interface enhancements for optimizing a finder's fee based on one or more criteria. By moving an activatable user interface component (e.g., a slider), the user may be able to view the predicted change with respect to factors pertaining to the listing, such as the time to sale and number of views. As the finder's fee is modified by the user, the corresponding graphs and values may be updated, giving the user insight into how adjusting the finder's fee may affect the possibility of completing a transaction. In example embodiments, the user may be able to select any of the various parameters pertaining to past transactions of items for which finder's fees were provided. Thus, in addition to the time to sale or number of views, the seller may view a visual representation of the data pertaining to any parameter included in the referral data 128. In example embodiments, the seller may apply combinations of parameters to determine an optimum finder's fee for the combinations, such as time to sale and total sales price.

FIG. 8 is an example user interface 800 for sorting search results based on the finder's fee associated with listings. In this example, the user has sorted the results of a keyword search (e.g., for "HOKA SHOES") such that the search results are listed from high to low with respect to the amount of the finder's fee. In this way, a potential intermediary may be able to quickly identify items (e.g., in a particular category) for which the intermediary may be able to collect the highest finder's fees.

Figure 9:
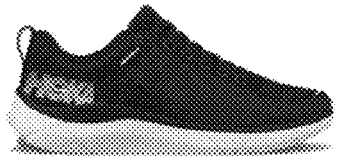
FIG. 9 is an example user interface for allowing an intermediary to communicate referrals to selected members of the intermediary's social networks using selected channels of communication.

FIG. 9 is an example user interface 900 for allowing an intermediary to communicate referrals to selected members of the intermediary's social networks using selected channels of communication. In this example, the user has selected a particular listing (e.g., via search or browsing) and has selected Joe to receive his recommendation. Here, the listing of contacts in the user's social network may be sorted based on likelihood of each contact completing a purchase pertaining to the item. This likelihood may be based on various factors, including purchase history of the referee, closeness of relationship between referrer and referee, analysis of posts may be the referee, expressions of emotions (e.g., likes, loves, dislikes, laughs, cries, and so on) that the user has made with respect to postings viewable by the referrer in the social networks, and so on. The referrer can specify a channel of communication over which to communicate the referral. A channel may be selected by default (e.g., based on known or inferred preferences of the referee with respect to communication channel).

Figure 10:
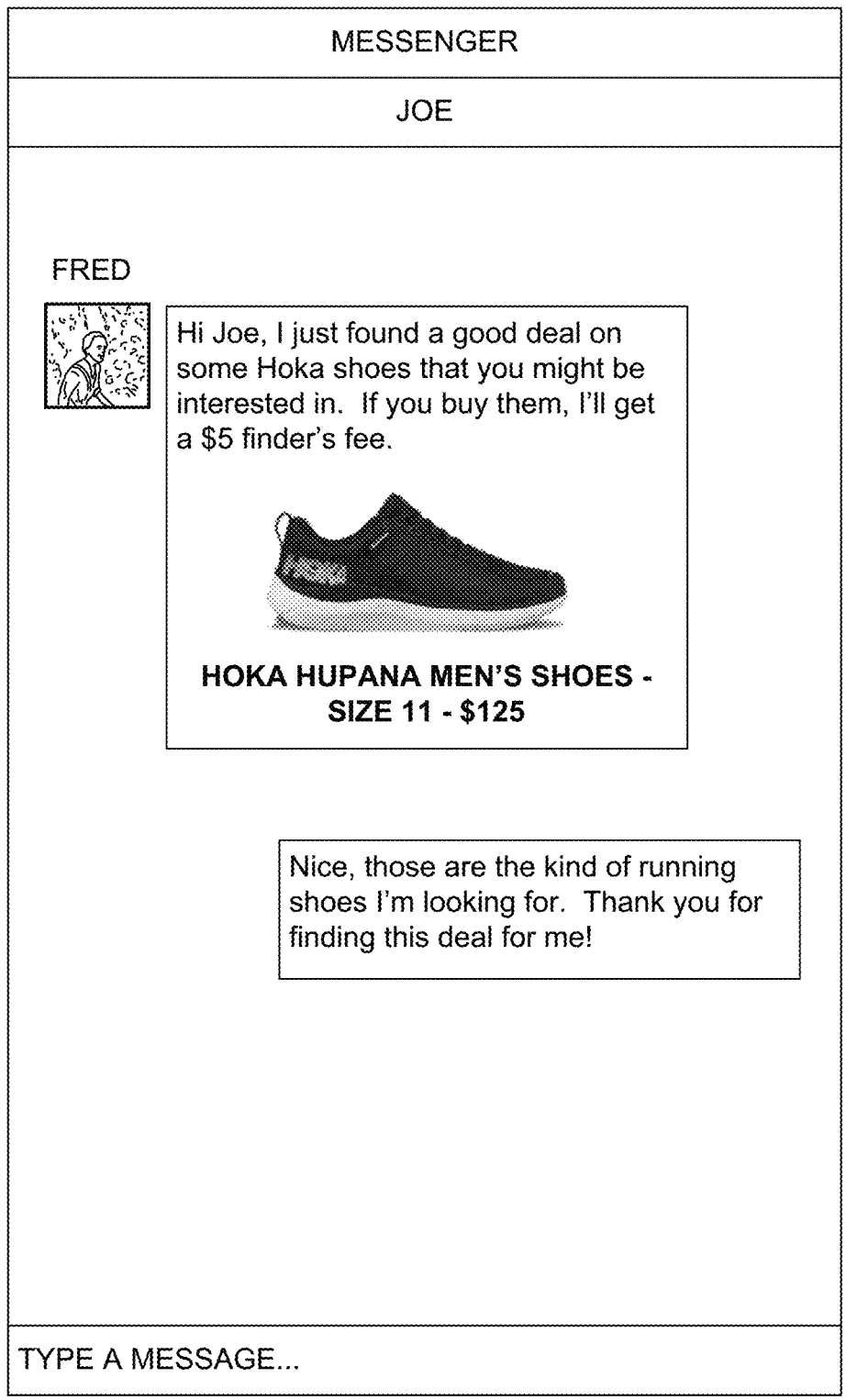
FIG. 10 is an example user interface for notifying one of the selected members of the referral initiated by the intermediary via the selected communication channel.

FIG. 10 is an example user interface 1000 for notifying one of the selected members of the referral initiated by the intermediary via the selected communication channel. Here, Fred has notified Joe via a messenger program that he has found a good deal on some HOKA ONE ONE® shoes. In example embodiments, this message may be stock message or it may be a custom message provided by Fred. The link may include a unique code identifying Fred as the referrer, as discussed above.

Figure 11:
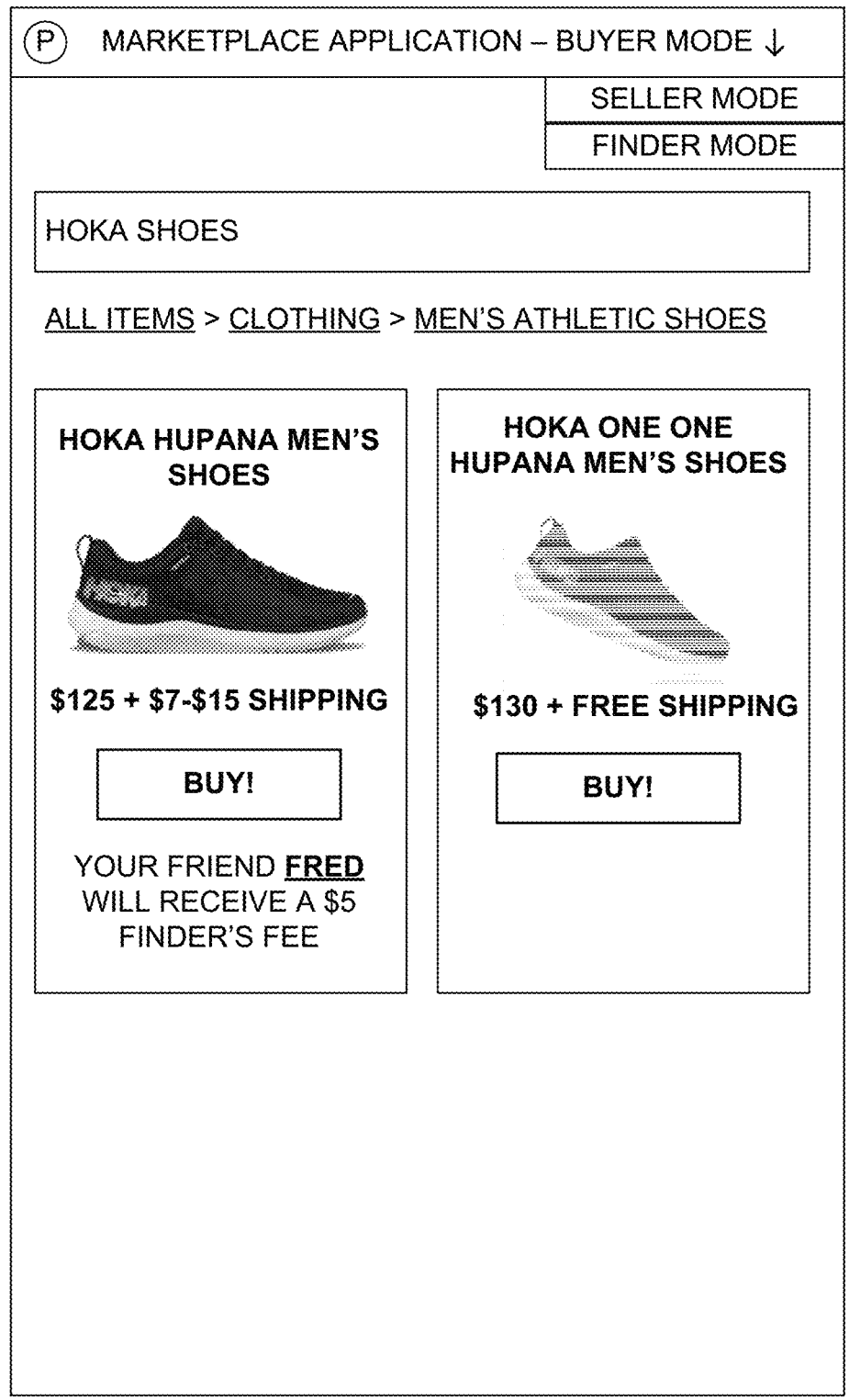
FIG. 11 is an example user interface for notifying one of the selected members of the referral initiated by the intermediary in response to a browsing or searching action by the referee.

FIG. 11 is an example user interface 1100 for notifying one of the selected members of the referral initiated by the intermediary in response to a browsing or searching action by the referee. Here, a potential buyer, such as Joe, has accessed two listings of HOKA® shoes. Because Fred has referred Joe to one of the listings, Joe is notified that Fred will receive a finder's fee if Joe buys the item featured in the listing.

Figure 12:
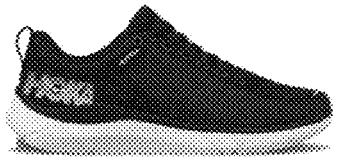
FIG. 12 is an example user interface for allowing a buyer to complete a transaction that will result in a finder's fee being provided to an intermediary.

FIG. 12 is an example user interface 1200 for allowing a buyer to complete a transaction that will result in a finder's fee being provided to an intermediary. Here, a potential buyer is on a checkout screen and is about to purchase an item featured in a listing. The potential buyer is reminded that his friend will receive a finder's fee, which may incentivize the potential buyer to complete his purchase.

FIG. 13 is an example user interface 1300 for notifying a user that his account has been credited with a finder's fee. Here, the intermediary is notified of the particular listing that was the subject of a referral by the intermediary to the intermediary's contact as well as the amount of the finder's fee that was credited to the intermediary's account.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a computer processor that is specially configured (e.g., using software), the computer processor may be specially configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 14:
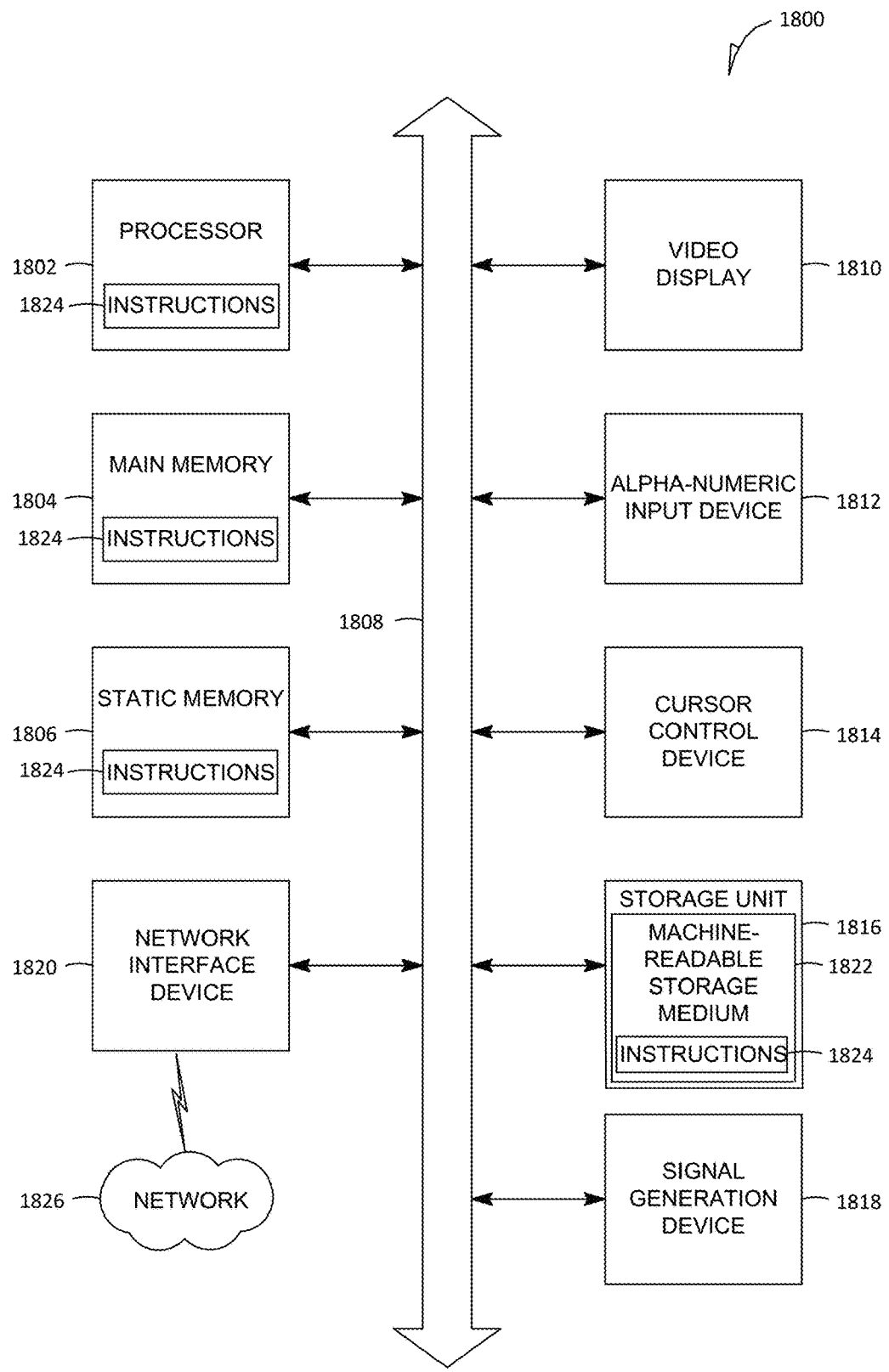
FIG. 14 is a block diagram of machine in the example form of a computer system within which instructions for causing the machine to perform any one or more of the methodologies discussed herein may be executed.

FIG. 14 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices. e.g., Erasable Programmable Read-Only Memory (EPROM). Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks. POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories;
   one or more modules incorporated into the one or more computer memories, the one or more modules configuring the one or more computer processors to perform operations for enhancing a posting user interface of a network-based publication system, the posting user interface allowing a seller to post a listing for an item on the network-based publication system, the operations comprising:
   determining that the seller has specified general information about the item in the posting user interface;
   creating a training set comprising one or more parameters pertaining to previous referral fees for previous items listed on the network-based publication system before a specified window of time, the previous items identified based on a matching of one or more attributes of the previous items to the specified general information;
   training a machine-learning algorithm by seeding the machine-learning algorithm with the training set;
   generating a suggested referral fee for the item, the generating including applying the trained machine-learning algorithm to transaction records of past transactions within the specified window of time;
   updating the training set incorporating the transaction records of past transactions within the specified window of time used to generate the suggested referral fee for the item;
   providing the suggested referral fee in a first supplemental user interface element of the posting user interface;
   determining a range of suggested referral fees for the item based on referral fees associated with the previous items that led to successful completions of transactions pertaining to the previous items;
   providing a second supplemental user interface element in conjunction with the first supplemental user interface element, the second supplemental user interface element being activatable for modifying the suggested referral fee within the determined range;
   based on a submission of the posting user interface, associating the suggested referral fee or the modified suggested referral fee with the item;
   receiving from a client device of a first user one or more notifications including an authorization from the first user to make a payment to complete a purchase of the item on the network-based publication system, the one or more notifications also including a referral code associated with the authorization;
   receiving notification of the payment from the first user into a holding account;
   based on the referral code, identifying a second user as the referrer;
   based on the notification of the payment, determining that the plurality of payments include a purchase fee and the referral fee; and
   causing transfer of the purchase fee to an account of the seller and causing transfer of the referral fee to an account of the referrer.

2. The system of claim 1, the operations comprising determining that the plurality of payments further include a service fee; and causing transfer of the service fee to an account of an operator of the network-based publication system.

3. The system of claim 1, the operations further comprising:
   generating a referral code based on a submitting of a recommendation user interface by the referrer, the submitting causing a recommendation to be sent to one or more referees within a social network of the referrer; and
   associating the referral code with the referrer.

4. The system of claim 1, the operations further comprising, based on a request from a client device of the referrer to access the listing, communicating a recommendation user interface for presentation on the client device of the referrer, the user interface including the referral fee and a user interface element allowing the referrer to submit a referral.

5. The system of claim 3, the operations further comprising communicating one or more messages to the one or more referees, the one or more messages notifying the one or more referees of the submission of the referral by the referrer, the one or more messages including a user interface element allowing the one or more referees to access the listing, the one or more messages including one or more metadata elements associating the referral with the referrer.

6. A method comprising:
   performing operations for enhancing a posting user interface of a network-based publication system, the posting user interface allowing a seller to post a listing for an item on the network-based publication system, the operations comprising:
   determining that the seller has specified general information about the item in the posting user interface;

creating a training set comprising one or more parameters pertaining to previous referral fees for previous items listed on the network-based publication system before a specified window of time, the previous items identified based on a matching of one or more attributes of the previous items to the specified general information;

training a machine-learning algorithm by seeding the machine-learning algorithm with the training set;

generating a suggested referral fee for the item, the generating including applying the trained machine-learning algorithm to transaction records of past transactions within the specified window of time;

updating the training set incorporating the transaction records of past transactions within the specified window of time used to generate the suggested referral fee for the item;

providing the suggested referral fee in a first supplemental user interface element of the posting user interface;

determining a range of suggested referral fees for the item based on referral fees associated with the previous items that led to successful completions of transactions pertaining to the previous items;

providing a second supplemental user interface element in conjunction with the first supplemental user interface element, the second supplemental user interface element being activatable for modifying the suggested referral fee within the determined range;

based on a submission of the posting user interface, associating the suggested referral fee or the modified suggested referral fee with the item;

receiving from a client device of a first user one or more notifications including an authorization from the first user to make a payment to complete a purchase of the item on the network-based publication system, the one or more notifications also including a referral code associated with the authorization;

receiving notification of the payment from the first user into a holding account;

based on the referral code, identifying a second user as the referrer;

based on the notification of the payment, determining that the plurality of payments include a purchase fee and the referral fee; and causing transfer of the purchase fee to an account of the seller and causing transfer of the referral fee to an account of the referrer.

7. The method of claim 6, the operations further comprising:

generating a referral code based on a submitting of a recommendation user interface by the referrer, the submitting causing a recommendation to be sent to one or more referees within a social network of the referrer; and associating the referral code with the referrer.

8. The method of claim 6, further comprising, based on a request from a client device of the second user to access the listing, communicating a user interface for presentation on the client device of the second user, the user interface including the referral fee and user interface element allowing the referrer to submit a referral.

9. The method of claim 8, further comprising communicating one or more messages to the one or more referees, the one or more messages notifying the one or more referees of the submission of the referral by the referrer, the one or more messages including a user interface element allowing the one or more referees to access the listing, the one or more messages including one or more metadata elements associating the referral with the referrer.

10. A non-transitory computer-readable storage medium storing instructions thereon, which, when executed by one or more processors, cause the one or more processors to perform operations for enhancing a posting user interface of a network-based publication system, the posting user interface allowing a seller to post a listing for an item on the network-based publication system, the user interface enhancement allowing the seller to specify a referral fee to associate with the listing, the operations comprising:

determining that the seller has specified general information about the item in the posting user interface;

creating a training set comprising one or more parameters pertaining to previous referral fees for previous items listed on the network-based publication system before a specified window of time, the previous items identified based on a matching of one or more attributes of the previous items to the specified general information;

training a machine-learning algorithm by seeding the machine-learning algorithm with the training set;

generating a suggested referral fee for the item, the generating including applying the trained machine-learning algorithm to transaction records of past transactions within the specified window of time;

updating the training set incorporating the transaction records of past transactions within the specified window of time used to generate the suggested referral fee for the item;

providing the suggested referral fee in a first supplemental user interface element of the posting user interface;

determining a range of suggested referral fees for the item based on referral fees associated with the previous items that led to successful completions of transactions pertaining to the previous items;

providing a second supplemental user interface element in conjunction with the first supplemental user interface element, the second supplemental user interface element being activatable for modifying the suggested referral fee within the determined range;

based on a submission of the posting user interface, associating the suggested referral fee or the modified suggested referral fee with the item;

receiving from a client device of a first user one or more notifications including an authorization from the first user to make a payment to complete a purchase of the item on the network-based publication system, the one or more notifications also including a referral code associated with the authorization;

receiving notification of the payment from the first user into a holding account;

based on the referral code, identifying a second user as the referrer;

based on the notification of the payment, determining that the plurality of payments include a purchase fee and the referral fee; and causing transfer of the purchase fee to an account of the seller and causing transfer of the referral fee to an account of the referrer.

11. The non-transitory computer-readable medium of claim 10, the operations comprising determining that the plurality of payments further include a service fee; and causing transfer of the service fee to an account of an operator of the network-based publication system.

12. The non-transitory computer-readable medium of claim 10, the operations further comprising:
  generating a referral code based on a submitting of a recommendation user interface by the referrer, the submitting causing a recommendation to be sent to one or more referees within a social network of the referrer; and
  associating the referral code with the referrer.

13. The non-transitory computer-readable medium of claim 10, the operations further comprising, based on a request from a client device of the referrer to access the listing, communicating a recommendation user interface for presentation on the client device of the referrer, the user interface including the referral fee and a user interface element allowing the referrer to submit a referral.

14. The system of claim 1, the operations further comprising providing a third supplemental user interface element in conjunction with the first supplemental user interface element, wherein the third supplemental user interface element includes an additional activatable user interface element for changing the referral and viewing insights into how the changing of the referral fee affects a probability of completing a transaction with respect to the item.

15. The system of claim 14, wherein a visual representation of data pertaining to the one or more parameters is automatically updated in the supplemental user interface based on activation of the additional activatable user interface element.

16. The system of claim 1, the operations further comprising automatically recalculating the suggested referral fee provided in the first supplemental user interface based on a detection of a change to the general information about the item in the posting user interface.

17. The system of claim 1, wherein the machine-learning algorithm is trained in real time based on historical transaction data pertaining to the identified previous items as the historical transaction data is collected.

18. The system of claim 1, wherein the one or more parameters are selectable in the supplemental user interface via a further activatable user interface element.

19. The method of claim 1, wherein the training of the machine-learning algorithm in real-time includes discarding older data pertaining to the previous items.

* * * * *

UNITED STATES PATENT AND TRADEMARK OFFICE
CERTIFICATE OF CORRECTION

PATENT NO. : 11,227,300 B2
APPLICATION NO. : 15/619207
DATED : January 18, 2022
INVENTOR(S) : Frederic Courtot It is certified that error appears in the above-identified patent and that said Letters Patent is hereby corrected as shown below:

In the Claims

In Column 20, Line 63, in Claim 11, after "computer-readable", insert --storage--

In Column 21, Line 1, in Claim 12, after "computer-readable", insert --storage--

In Column 21, Line 8, in Claim 13, after "computer-readable", insert --storage--

In Column 22, Line 19, in Claim 19, delete "method" and insert --system-- therefor Signed and Sealed this
Seventeenth Day of May, 2022

Katherine Kelly Vidal
*Director of the United States Patent and Trademark Office*